US006484987B2

(12) United States Patent
Weaver

(10) Patent No.: US 6,484,987 B2
(45) Date of Patent: Nov. 26, 2002

(54) MOUNTING BRACKET

(75) Inventor: Timothy H. Weaver, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/751,460

(22) Filed: Dec. 29, 2000

(65) Prior Publication Data

US 2002/0084396 A1 Jul. 4, 2002

(51) Int. Cl.[7] ................................................ E04G 3/00
(52) U.S. Cl. ................................................ 248/278.1
(58) Field of Search .......................... 248/278.1, 276.1; 343/765, 882, 892

(56) References Cited

U.S. PATENT DOCUMENTS

| 110,434 A | 12/1870 | Clarke |
| 780,947 A | 1/1905 | Grabe |
| 1,303,249 A | 5/1919 | Brown |
| 1,522,751 A | 1/1925 | Sechler |

(List continued on next page.)

*Primary Examiner*—Ramon O. Ramirez
*Assistant Examiner*—Kofi Schulterbrandt
(74) *Attorney, Agent, or Firm*—Kirkpatrick & Lockhart LLP

(57) ABSTRACT

A mounting bracket for adjustably supporting an object about one or more axes. The bracket may include a support member that is pivotally attached to a mounting member such that the support member may be selectively pivoted about a first pivot axis relative to the mounting member and thereafter releasably locked in that position. Adjustment components may be provided to facilitate controlled pivotal travel of the support member about the first pivot axis and which non-movably retains the support member in a desired position as the locking members are locked. The bracket may further comprise an antenna mast support member that is pivotally attached to the support member for selective pivotal travel about a second pivot axis relative to the support member and thereafter releasably locked in position. Additional adjustment components may be provided to facilitate the controlled pivotal travel of the antenna mast support member about the second pivot axis and which non-movably retains the antenna mast support member in a desired position as it is locked in that position.

29 Claims, 16 Drawing Sheets

U.S. PATENT DOCUMENTS

| | | |
|---|---|---|
| 1,935,246 A | 11/1933 | Kirsch |
| 2,463,176 A | 3/1949 | Hogrefe |
| 2,575,917 A | 11/1951 | Johnson |
| 2,611,566 A | 9/1952 | Landis |
| 2,614,861 A | 10/1952 | Van Horn |
| 2,667,317 A | 1/1954 | Trebules |
| 2,754,156 A | 7/1956 | Elderkin |
| 3,910,561 A | 10/1975 | Fornells |
| 3,941,340 A | 3/1976 | Rankins |
| 4,126,865 A | 11/1978 | Longhurst et al. |
| 4,495,706 A | 1/1985 | Kaminski |
| 4,626,864 A | 12/1986 | Micklethwaite |
| 4,691,207 A | 9/1987 | Timineri |
| 4,726,259 A | 2/1988 | Idler |
| 4,833,932 A * | 5/1989 | Rogers ................... 74/5.1 |
| 5,065,969 A | 11/1991 | McLean |
| 5,088,672 A | 2/1992 | Neuendorf et al. |
| 5,276,972 A | 1/1994 | Staney |
| 5,351,060 A | 9/1994 | Bayne |
| 5,469,182 A | 11/1995 | Chaffee |
| 5,473,335 A * | 12/1995 | Tines ..................... 343/766 |
| 5,561,433 A | 10/1996 | Chaney et al. |
| 5,646,638 A | 7/1997 | Winegard et al. |
| 5,647,134 A | 7/1997 | Chou |
| 5,657,031 A | 8/1997 | Anderson et al. |
| 5,664,752 A | 9/1997 | Matthiessen et al. |
| 5,734,356 A | 3/1998 | Chang |
| 5,760,739 A | 6/1998 | Pauli |
| 5,829,121 A | 11/1998 | Shoemaker et al. |
| 5,870,059 A | 2/1999 | Reynolds |
| 5,894,674 A | 4/1999 | Feldman |
| 5,903,237 A | 5/1999 | Crosby et al. |
| 5,920,291 A | 7/1999 | Bosley |
| 5,933,123 A | 8/1999 | Kaul |
| D413,603 S | 9/1999 | Inoue |
| 5,977,922 A | 11/1999 | Hemmingsen, II |
| 5,992,809 A * | 11/1999 | Sweere et al. ........... 248/278.1 |
| 5,999,139 A | 12/1999 | Benjamin et al. |
| 6,023,247 A * | 2/2000 | Rodeffer .................. 343/765 |
| 6,031,508 A | 2/2000 | Ishizuka et al. |
| 6,037,913 A * | 3/2000 | Johnson .................. 343/882 |
| 6,188,372 B1 | 2/2001 | Jackson et al. |
| 6,208,314 B1 | 3/2001 | Bourquin |
| 6,262,687 B1 * | 7/2001 | Bai et al. ................ 343/757 |
| 6,285,338 B1 * | 9/2001 | Bai et al. ................ 343/882 |
| 6,331,839 B1 | 12/2001 | Grenell |

* cited by examiner

MOUNTING BRACKET

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to mounting brackets and devices and, more particularly, to brackets for adjustably supporting objects including antennas and the like.

2. Description of the Invention Background

The advent of the television can be traced as far back to the end of the nineteenth century and beginning of the twentieth century. However, it wasn't until 1923 and 1924, when Vladimir Kosma Zworkykin invented the iconoscope, a device that permitted pictures to be electronically broken down into hundreds of thousands of components for transmission, and the kinescope, a television signal receiver, did the concept of television become a reality. Zworkykin continued to improve those early inventions and television was reportedly first showcased to the world at the 1939 World's Fair in New York, where regular broadcasting began.

Over the years, many improvements to televisions and devices and methods for transmitting and receiving television signals have been made. In the early days of television, signals were transmitted via terrestrial radio networks and received through the use of antennas. Signal strength and quality, however, were often dependent upon the geography of the land between the transmitting antenna and the receiving antenna. Although such transmission methods are still in use today, the use of satellites to transmit television signals is becoming more prevalent. Because satellite transmitted signals are not hampered by hills, trees, mountains, etc., such signals typically offer the viewer more viewing options and improved picture quality. Thus, many companies have found offering satellite television services to be very profitable and, therefore, it is anticipated that more and more satellites will be placed in orbit in the years to come. As additional satellites are added, more precise antenna/satellite alignment methods and apparatuses will be required.

Modem digital satellite communication systems typically employ a ground-based transmitter that beams an uplink signal to a satellite positioned in geosynchronous orbit. The satellite relays the signal back to ground-based receivers. Such systems permit the household or business subscribing to the system to receive audio, data and video signals directly from the satellite by means of a relatively small directional receiver antenna. Such antennas are commonly affixed to the roof or wall of the subscriber's residence or are mounted to a tree or mast located in the subscriber's yard. A typical antenna constructed to received satellite signals comprises a dish-shaped reflector that has a support arm protruding outward from the front surface of the reflector. The support arm supports a low noise block amplifier with an integrated feed "LNBF". The reflector collects and focuses the satellite signal onto the LNBF which is connected, via cable, to the subscriber's television.

To obtain an optimum signal, the antenna must be installed such that the centerline axis of the reflector, also known as the "bore site" or "pointing axis", is accurately aligned with the satellite. To align an antenna with a particular satellite, the installer must be provided with accurate positioning information for that particular satellite. For example, the installer must know the proper azimuth and elevation settings for the antenna. The azimuth setting is the compass direction that the antenna should be pointed relative to magnetic north. The elevation setting is the angle between the Earth and the satellite above the horizon. Many companies provide installers with alignment information that is specific to the geographical area in which the antenna is to be installed. Also, as the satellite orbits the earth, it may be so oriented such that it sends a signal that is somewhat skewed. To obtain an optimum signal, the antenna must also be adjustable to compensate for a skewed satellite orientation.

The ability to quickly and accurately align the centerline axis of antenna with a satellite is somewhat dependent upon the type of mounting arrangement employed to support the antenna. Prior antenna mounting arrangements typically comprise a mounting bracket that is directly affixed to the rear surface of the reflector. The mounting bracket is then attached to a vertically oriented mast that is buried in the earth, mounted to a tree, or mounted to a portion of the subscriber's residence or place of business. The mast is installed such that it is plumb (i.e., relatively perpendicular to the horizon). Thereafter, the installer must orient the antenna to the proper azimuth and elevation. These adjustments are typically made at the mounting bracket. Prior mounting brackets commonly employ a collection of bolts that must first be loosened to permit the antenna to be adjusted in one of the desired directions. After the installer initially positions the antenna in the desired position, the locking bolts for that portion of the bracket are tightened and other bolts are loosened to permit the second adjustment to be made. It will be appreciated that the process of tightening the locking bolts can actually cause the antenna to move out of its optimum position which can deteriorate the quality of the signal or, in extreme situations, require the installer to re-loosen the bolts and begin the alignment process over again. Furthermore, such mounting apparatuses cannot accommodate relatively fine adjustments to the antenna. In addition, because such crude bracket arrangements are attached directly to the rear of the reflector, they can detract from the reflector's aesthetic appearance.

There is a need for a mounting bracket for adjustably supporting an object about one or more axes that can be precisely adjusted in a controlled manner and that can retain the object in the desired orientation.

Yet another need exists for a mounting bracket having the above-mentioned attributes that can support an antenna mounting mast therein without detracting from the aesthetic appearance of the antenna.

SUMMARY OF THE INVENTION

In accordance with one form of the present invention, there is provided a mounting bracket for adjustably supporting an object about a first pivot axis. On embodiment of the bracket includes a mounting member and a support member that is pivotally attached to the mounting member for selective pivotal travel about the first pivot axis. The bracket of this embodiment also includes a first adjustment assembly that is attached to the mounting member and the support member for selectively adjusting the position of the support member about the first pivot axis in a controlled and precise manner. The bracket further includes a first lock member for selectively preventing pivotal travel of the support member about the first pivot axis relative to the mounting member. An object support member is also attached to the support member.

In another embodiment, the object support member is pivotally attached to the support member for selective pivotal travel about a second pivot axis. A second lock member for selectively preventing pivotal travel of the object support member about the second pivot axis in a controlled and precise manner. In addition, this embodiment may include a second adjustment assembly that is attached to the support member and the object support member for selectively adjusting the position of the object support member about the second pivot axis relative to the support member. The object support member may be provided with a socket for receiving a portion of an object such as an antenna mast therein.

It is a feature of the present invention to provide a mounting bracket that can be attached to a supporting structure, such as a building, tree, vertically extending pole or mast and that can adjustably support an object in desired orientations.

It is another feature of the present invention to provide a mounting bracket that pivotally supports an object about a first axis and that can be readily adjusted to pivot the object about the first axis in a precise and controlled manner and locked in position after the adjustments have been completed.

Yet another feature of the present invention is to provide a means for retaining the object in the desired position about the first axis, while the locking means of the mounting bracket is locked to retain the object in that position.

It is another feature of the present invention to provide a mounting bracket that pivotally supports an object about a second axis and that can be readily adjusted to pivot the object about the second axis in a precise and controlled manner and locked in that position after the adjustment had been made.

Another feature of the present invention is to provide a means for retaining the object in a desired position about the second axis, while the locking means of the mounting bracket is locked to retain the object in that position.

Yet another feature of the present invention is to provide a mounting bracket that can pivotally support an object about at least two axes and permit relatively precise and controlled adjustment of that object about those axes and have means for retaining the object in position about one axis while the object is being pivoted about the other axis.

Still another feature of the present invention is to provide a mounting bracket with one or more of the above-mentioned attributes that is fabricated from corrosion resistant materials.

Another feature of the present invention is to provide a mounting bracket having one or more of the above-mentioned attributes that can be readily adjusted with a single conventional hand tool.

Accordingly, the present invention provides solutions to the shortcomings of prior mounting brackets and particularly those mounting brackets used to support antennas, receivers, and the like. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE EMBODIMENTS OF THE INVENTION

Figure 1:
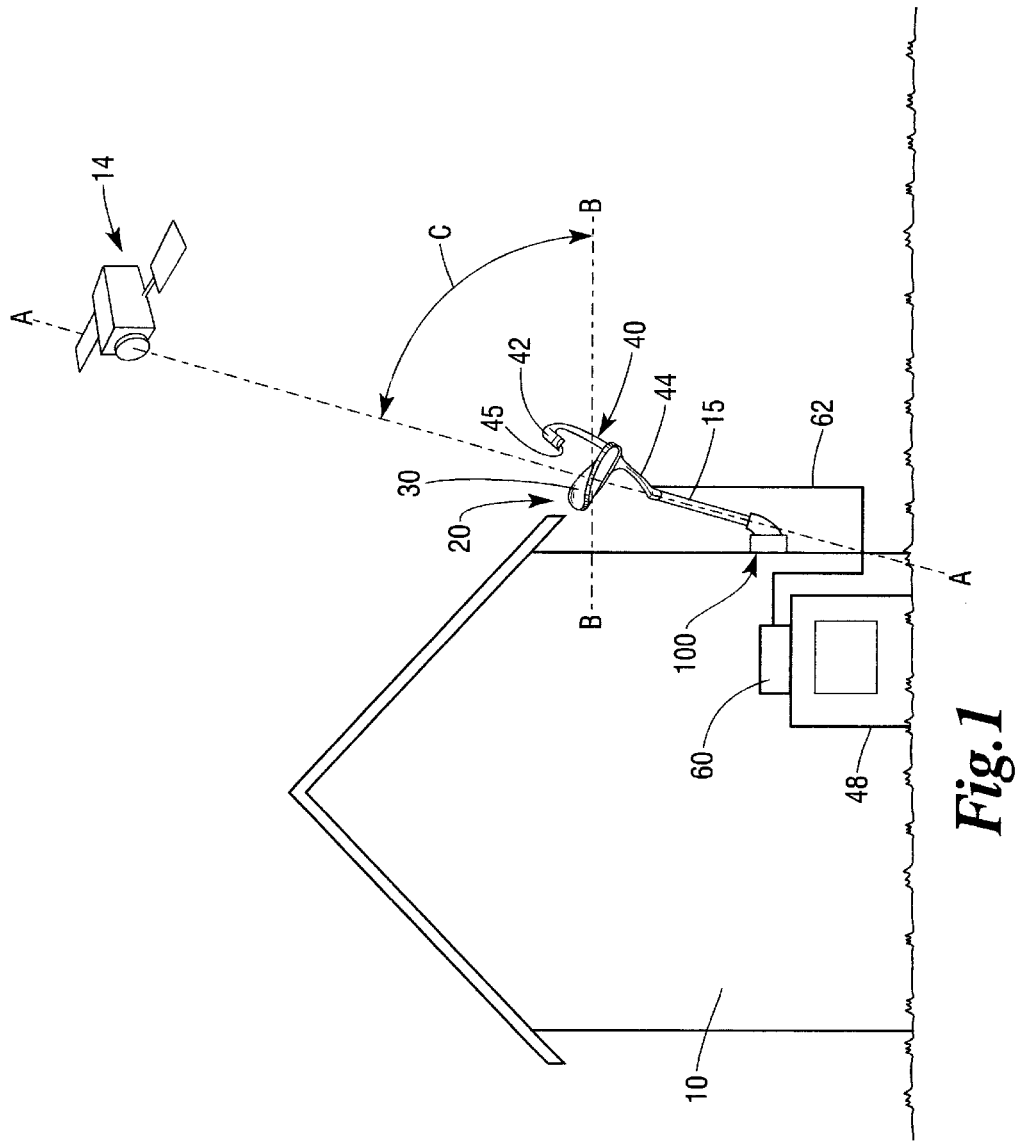
FIG. 1 is a graphical representation of an antenna attached to a building and aligned to receive a signal from a satellite.

Referring now to the drawings for the purposes of illustrating embodiments of the invention only and not for the purposes of limiting the same, FIG. 1 illustrates an antenna 20 that is attached to the wall of a residence or other building 10 by a mounting bracket 100 of the present invention. The antenna 20 is oriented to receive audio, video and data signals from a satellite 14 in geosynchronous orbit around the earth. The antenna 20 includes parabolic reflector 30 and an arm assembly 40 that includes a forwardly extending portion 42 that supports a feed/LNBF assembly 45 for collecting focused signals from the reflector 30. Such feed/LNBF assemblies are known in the art and, therefore, the manufacture and operation of feed/LNBF assembly 45 will not be discussed herein.

The antenna 20 is attached to a satellite broadcast receiver ("set top box") 60 by coaxial cable 62. The set top box 60 is attached to a television monitor 48. Such set top boxes are known in the art and comprise an integrated receiver decoder for decoding the received broadcast signals from the antenna 20. During operation, the feed/LNBF assembly 45 converts the focused signals from the satellite 14 to an electrical current that is amplified and down converted in frequency. The amplified and down-converted signals are then conveyed via cable 62 to the set top box 60. The set top box 60 tunes the output signal to a carrier signal within a predetermined frequency range. A tuner/demodulator within the set top box 60 decodes the signal carrier into a digital data stream selected signal. Also a video/audio decoder is provided within the set top box 60 to decode the encrypted video signal. A conventional user interface on the television screen is employed to assist the installer of the antenna 20 during the final alignment and "pointing" of the antenna 20.

Figure 2:
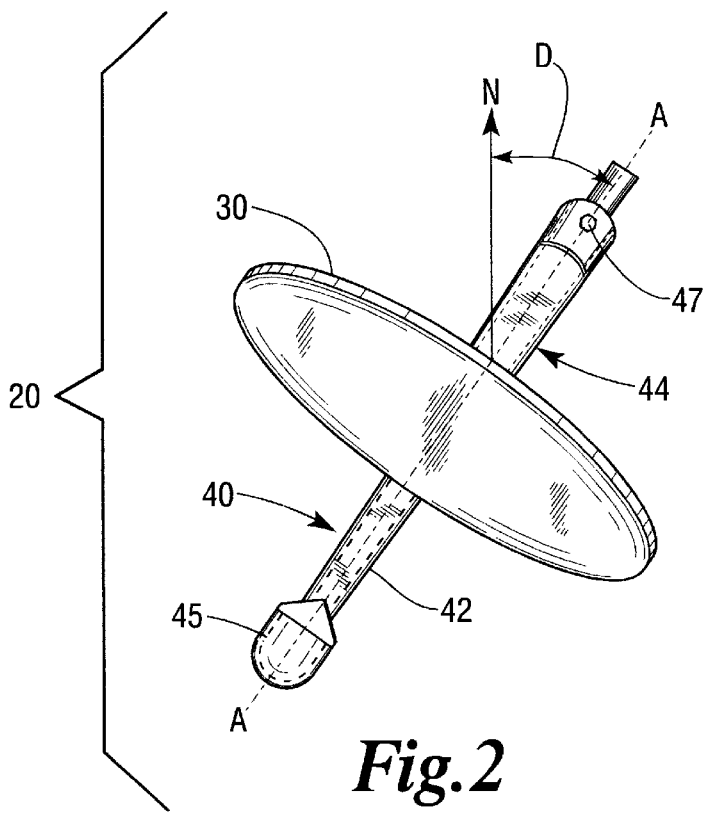
FIG. 2 is a plan view of an antenna attached to a mounting bracket illustrated in graphical form.

Antenna 20 must be properly positioned to receive the television signals transmitted by the satellite 14 to provide optimal image and audible responses. This positioning process involves accurately aligning the antenna's centerline axis A—A, with the satellite's output signal. "Elevation", "azimuth" and "skew" adjustments are commonly required to accomplish this task. As shown in FIG. 1, "elevation" refers to the angle between the centerline axis A—A of the antenna relative to the horizon (represented by line B—B), generally designated as angle "C". As shown in FIG. 2, "azimuth" refers to the angle of axis A—A relative to the direction of true north in a horizontal plane. That angle is generally designated as angle "D" in FIG. 2. "Skew" refers the angle of rotation of the antenna 20 about the centerline or boresite A—A of the antenna.

While the mounting bracket 100 of the present invention is described herein for mounting and adjusting antenna as described above, the skilled artisan will readily appreciate that the mounting bracket 100 of the present invention may be successfully employed to adjustably support a variety of other antennas without departing from the spirit and scope of the present invention. Furthermore, the mounting bracket 100 of the present invention could be successfully used to adjustably support a variety of different objects wherein it is desirable to precisely adjust the object about one or more axes. Thus, the protection afforded to the present invention should not be limited to use in connection with antennas.

Figure 4:
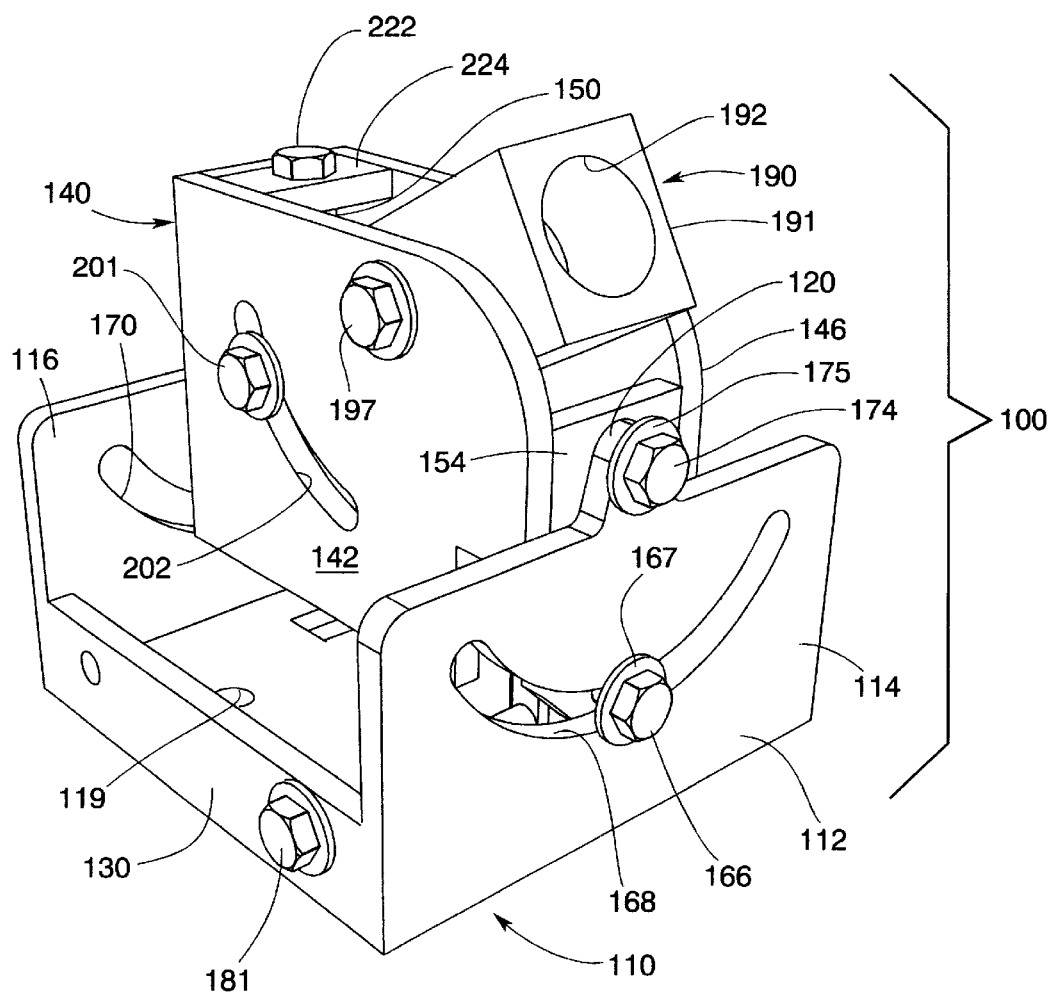
FIG. 4 is a perspective view of one embodiment of the mounting bracket of the present invention.
Figure 5:
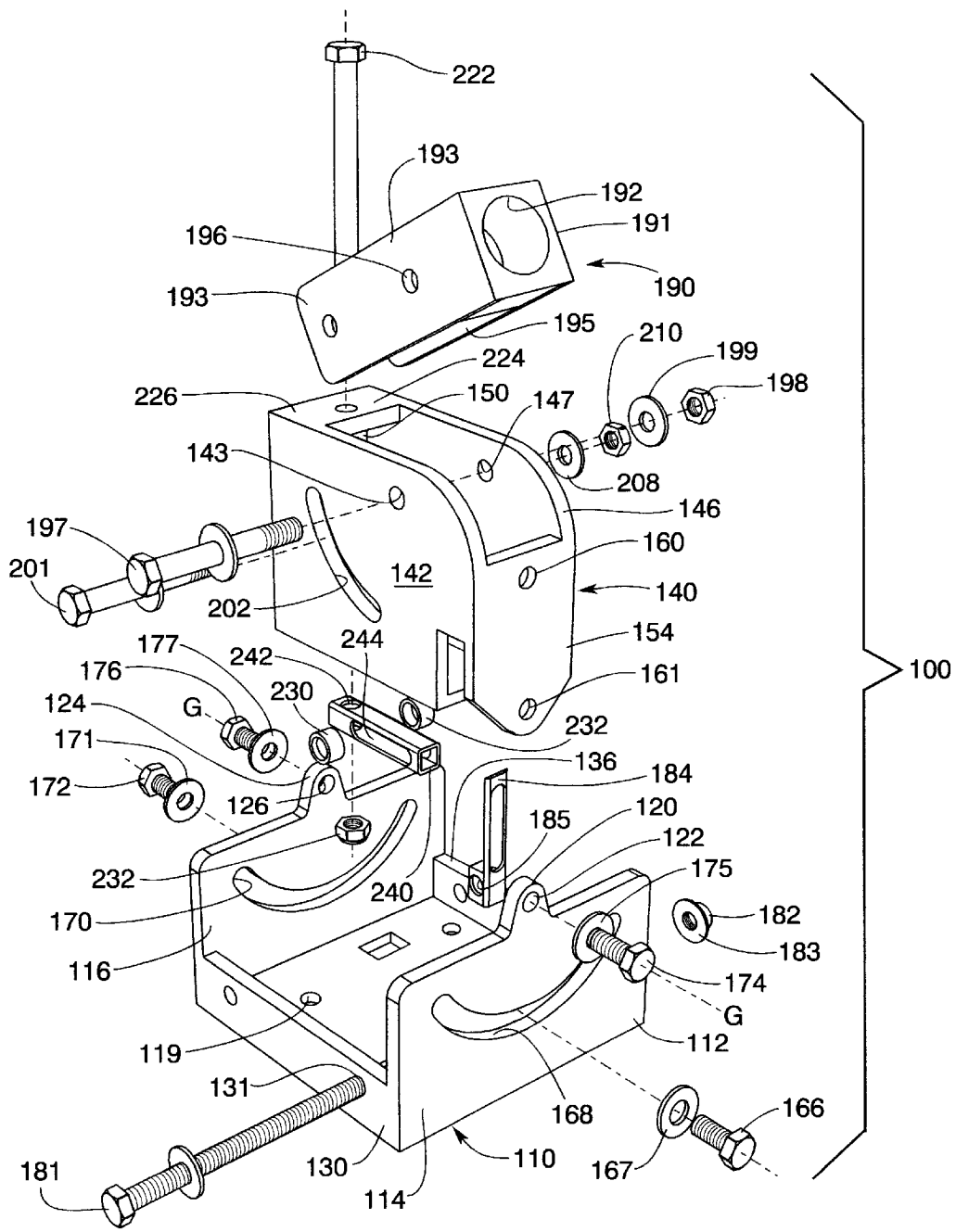
FIG. 5 is an exploded assembly view of the mounting bracket depicted in FIG. 4.
Figure 6:
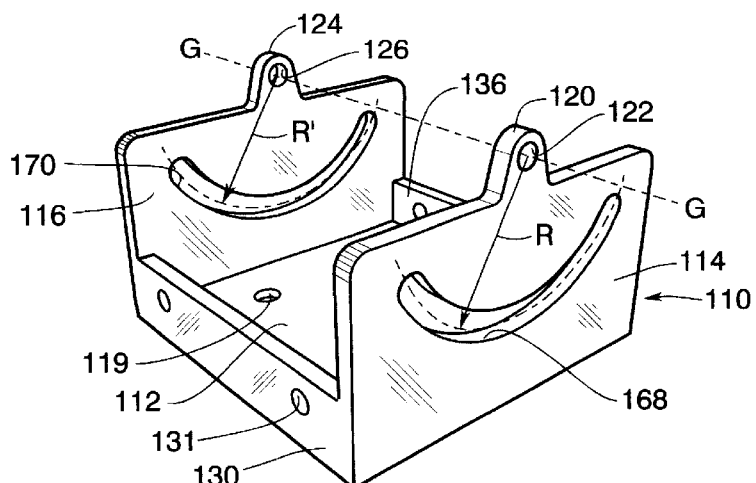
FIG. 6 is a perspective view of a mounting member of the mounting bracket depicted in FIGS. 4 and 5.

Turning to FIGS. 4–6, the mounting bracket 100 includes a mounting member 110 that has a rear portion 112, a top portion 114 and a bottom portion 116. The portions of mounting member 110 may be fabricated from metal, such as aluminum, stainless steel, galvanized steel, etc and be of welded or stamped construction or otherwise connected by other conventional fasteners. It will be further appreciated, however, that the mounting member 110 could be molded or otherwise fabricated from a polymeric material or other non-corrosive material. As can be seen in FIG. 6, the top portion 110 has an upper locking protrusion 120 that has a hole 122 therethrough. Similarly, the bottom portion 116 has a lower protrusion 124 that has a hole 126 therethrough. Holes (122, 126) are coaxially aligned along a "first" pivot axis, generally designated as G—G. To facilitate attachment of the mounting member 110 to a variety of different support surfaces or members, a series of mounting holes 119 are provided through the rear portion 112. See FIG. 10. The mounting member 110 also includes side support members (130, 136).

Figure 11:
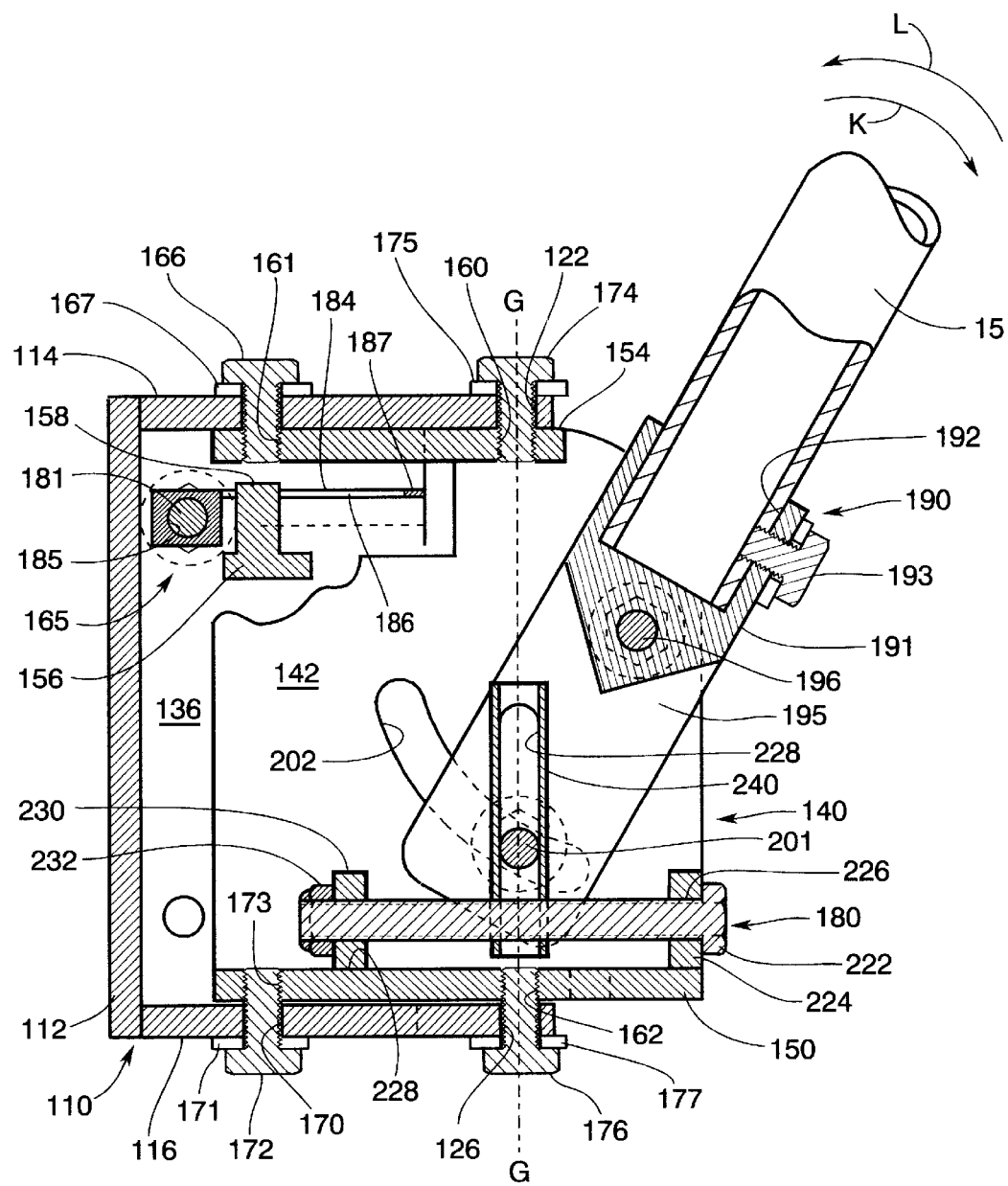
FIG. 11 is a cross-sectional view of the mounting bracket depicted in FIGS. 4–10 taken along line XI—XI in FIG. 9.

The mounting member 110 pivotally supports a support member 140. In one embodiment, the support member 140 includes a pair of side plates (142, 146), a bottom portion 150 and a top portion 154. The support member 140 may be fabricated from metal, such as aluminum, stainless steel, galvanized steel, etc. and be of welded or stamped construction or the various portions of the support member 140 may be interconnected utilizing other conventional fasteners. It will be further appreciated, however, that the support member 140 could be molded or otherwise fabricated from a polymeric material or other non-corrosive material. As can be seen in FIG. 11, a pair of threaded top pivot holes 160 and 161 extend through the top portion 154 and a threaded bottom pivot hole 162 extends through the bottom portion 150. When assembled as shown in FIG. 11, holes (160, 162) are coaxially aligned along the first pivot axis "G—G". The support member 140 is pivotally supported on the mounting member 110 by a "first locking member" which may comprise a top locking screw 174 extends through the upper hole 122 in the upper portion 114 of the mounting member 110 and is threadably received in an upper threaded hole 160 in the top portion 154 of the support member 140. A top washer 175 may be placed on screw 174. In addition, the support member 140 is further pivotally supported on the mounting member 110 by a "second locking member" which may comprise a bottom locking screw 176 extends through the bottom hole 126 in the bottom portion 116 of the mounting member 110 to be threadably received in a lower threaded hole 162 in the bottom portion 150 of the support member 140. A washer 177 may be placed on screw 176 as shown. As can also be seen in FIG. 9, in this embodiment another "first locking member" which may comprise a locking screw 166 extends through an arcuate top slot 168 in the top portion 114 of the mounting member 110 and is threadably received in threaded hole 161 in the top portion 154 of the support member 140. A washer 167 may be placed on the screw 166. Also in this embodiment, another "second locking member" which may comprise a locking screw 172 extends through an arcuate bottom slot 170 through the bottom portion 116 of the mounting member 110 to be threadably received in a threaded hole 173 in the bottom portion 150 of the support member 140. A washer 171 may be placed on screw 172 as shown.

The arcuate top slot 168 is radially aligned about the center of hole 122 through which axis G—G extends. Similarly, the arcuate bottom slot 170 is radially aligned about the center of hole 126 through which the first pivot axis G—G extends. Slot 168 is sized to slidably receive a portion of the locking screw 166 therethrough. The center of arcuate slot 168 is oriented at a radius "R" with respect to the center of hole 122. The arcuate slot 170 is sized to slidably receive a portion of the locking screw 172 therein. The center of arcuate slot 170 is oriented at a radius "R'" that is equal to radius R. See FIG. 6. Those of ordinary skill in the art will appreciate that when the locking screws (166, 172, 174, 176) are loosened, the support member 140 can pivot about the first pivot axis G—G relative to the mounting member 110.

Figure 7:
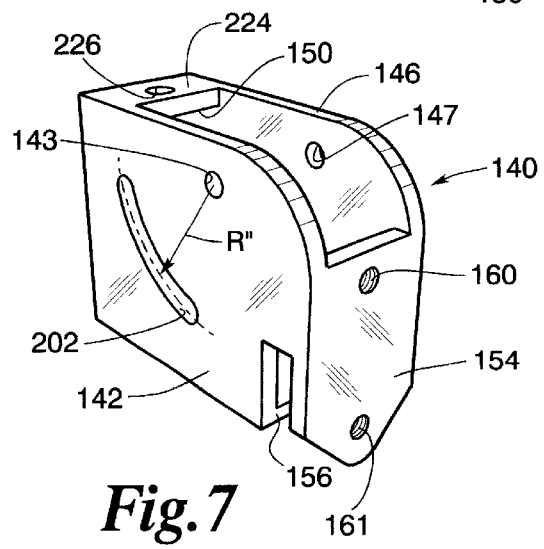
FIG. 7 is a perspective view of a support member of the mounting bracket depicted in FIGS. 4–6.
Figure 13:
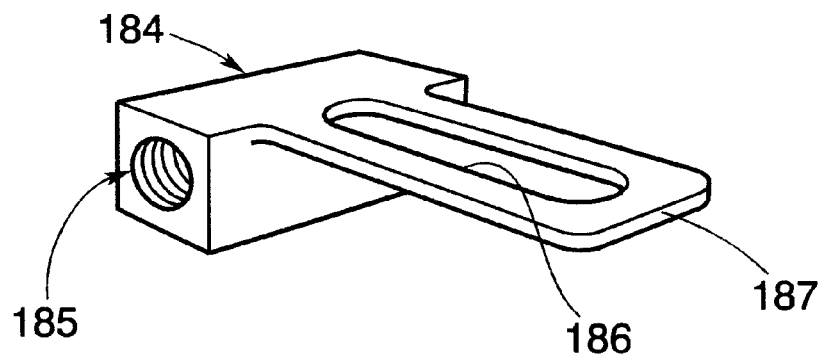
FIG. 13 is a perspective view of a pivot bar of a mounting bracket of the present invention.
Figure 14:
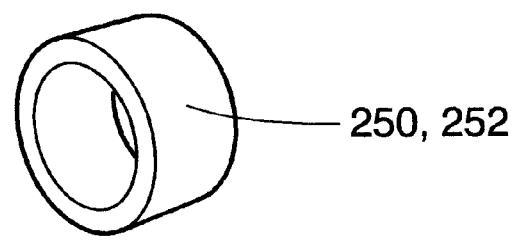
FIG. 14 is a perspective view of a spacer sleeve of a mounting bracket of the present invention.

Also in this embodiment, to control the pivotal travel of the support member 140 about the first pivot axis G—G and to positively retain the support member 140 in position while the locking screws (166, 172, 174, 176) are tightened, a "first adjustment assembly" or "first means for retaining", generally designated as 165, is provided. More specifically and with reference to FIGS. 7 and 11, the adjustment assembly or means for retaining of this embodiment includes a "pivot member" which may comprise a pivot pin 158 that protrudes from a support bar 156 that is formed in the support member 140. The first adjustment assembly or first means for retaining of this embodiment also includes a first "rotatable adjustment member" which may comprise a threaded adjustment bolt 181 that extends through a non-threaded hole 131 in side member 130. The first adjustment bolt 181 also extends through a non-threaded hole 137 in the side member 136. The first adjustment bolt 181 is threaded along its entire length and is rotatably retained in the holes (131, 137) by a lock nut 182 and washer 183. A pivot bar 184 is threadably received on the first adjustment bolt 181. The pivot bar 184 may be fabricated from a metal or plastic in the configuration shown in FIG. 13. One end of the pivot bar 184 has a pair of coaxially aligned threaded holes 185 for attaching the pivot bar 184 to the first threaded adjustment bolt 181. As can be further seen in FIG. 13, the pivot bar 184 has a tongue portion 187 that has an axially extending slot 186 for slidably receiving a portion of the pivot pin 158 therein.

In this embodiment, the skilled artisan will appreciate that, after the locking screws (166, 172, 174, 176) have been loosened, the support member 140 may be selectively pivoted about the first pivot axis G—G in the directions represented by arrows "H" and "I" by rotating the first adjustment bolt 181 in the appropriate directions. See FIG. 9. After the support member 140 has been pivoted to a desired position about the first pivot axis G—G, it may be "locked" in position by tightening screws (166, 172, 174, 176).

Figure 8:
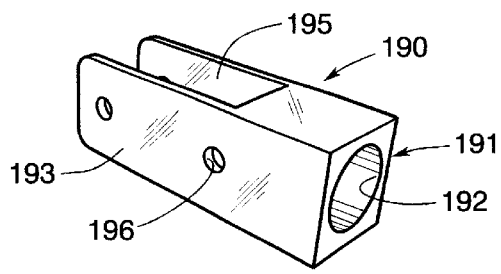
FIG. 8 is a perspective view of a mast support member of the mounting bracket depicted in FIGS. 4–7.

This embodiment of the mounting bracket 100 of the present invention further comprises an object support member or mast support member 190 that is pivotally supported by the support member 140. While the mast support member 190 as described herein is particularly suited for supporting an antenna mast therein, those of ordinary skill in the art will appreciate that the mast support member may be constructed to support a variety of other objects without departing from the spirit and scope of the present invention. It will be further appreciated that for applications wherein pivotal travel of the object about a single axis (i.e., axis G—G) is required, the mast support member 190 may be rigidly attached to the support member 140 or comprise an integral portion of the support member 140. As can be seen in FIGS. 8 and 11, in this embodiment, the mast support member 190 has a mast-supporting end 191 that has a socket 192 therein sized to receive a portion of an antenna support member which may comprise an antenna mast 15 therein. A pair of spaced-apart mounting plates (193, 195) protrude from the mast-supporting end 191. The mast-supporting end 191 has a hole 196 extending therethrough that is adapted to be coaxially aligned with hole 143 in the side plate 142 and hole 147 in the side plate 146 of the support member 140 along a second pivot axis J—J. The second pivot axis J—J may be perpendicular to the first pivot axis G—G. The mast support member 190 is pivotally attached to the support member 140 by a pivot bolt 197 that extends through the holes (143, 196, 147) and is retained therein by a nut 198 and washer 199. Thus, when the nut 198 is loosened, the mast support member 190 is free to pivot about the second pivot axis J—J relative to the support member 140.

Figure 9:
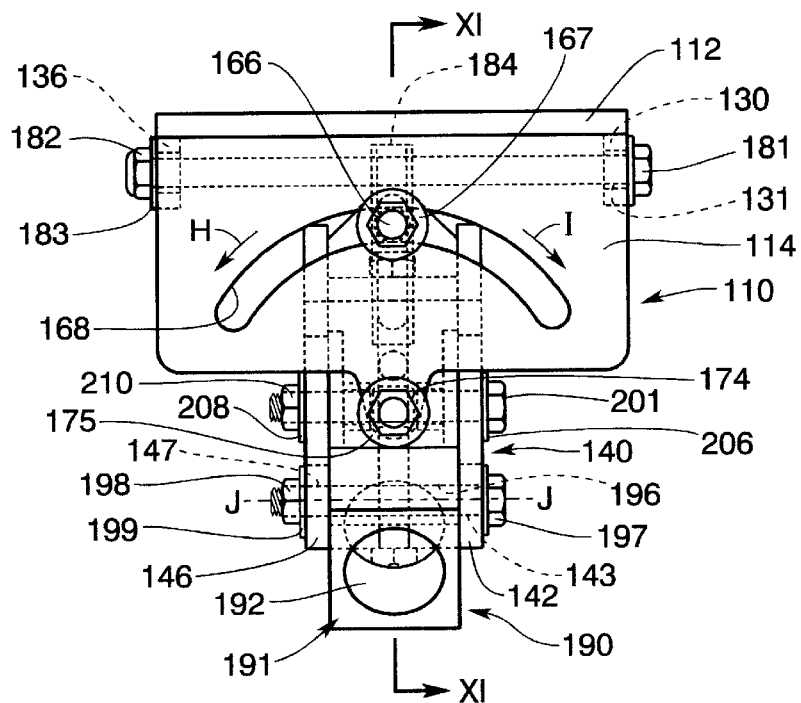
FIG. 9 is a top assembly view of the mounting bracket depicted in FIGS. 4–8.
Figure 10:
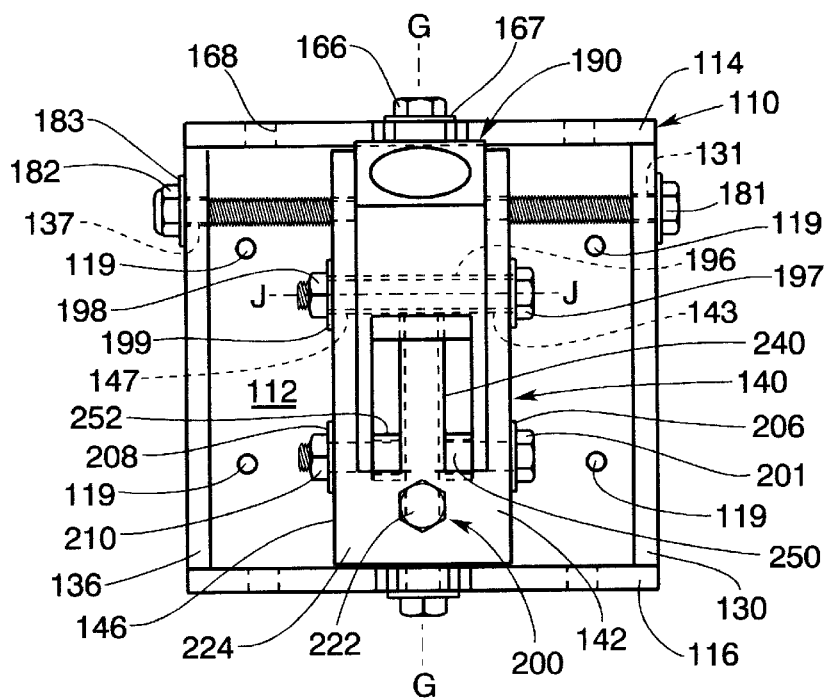
FIG. 10 is a front assembly view of the mounting bracket depicted in FIGS. 4–9.
Figure 12:
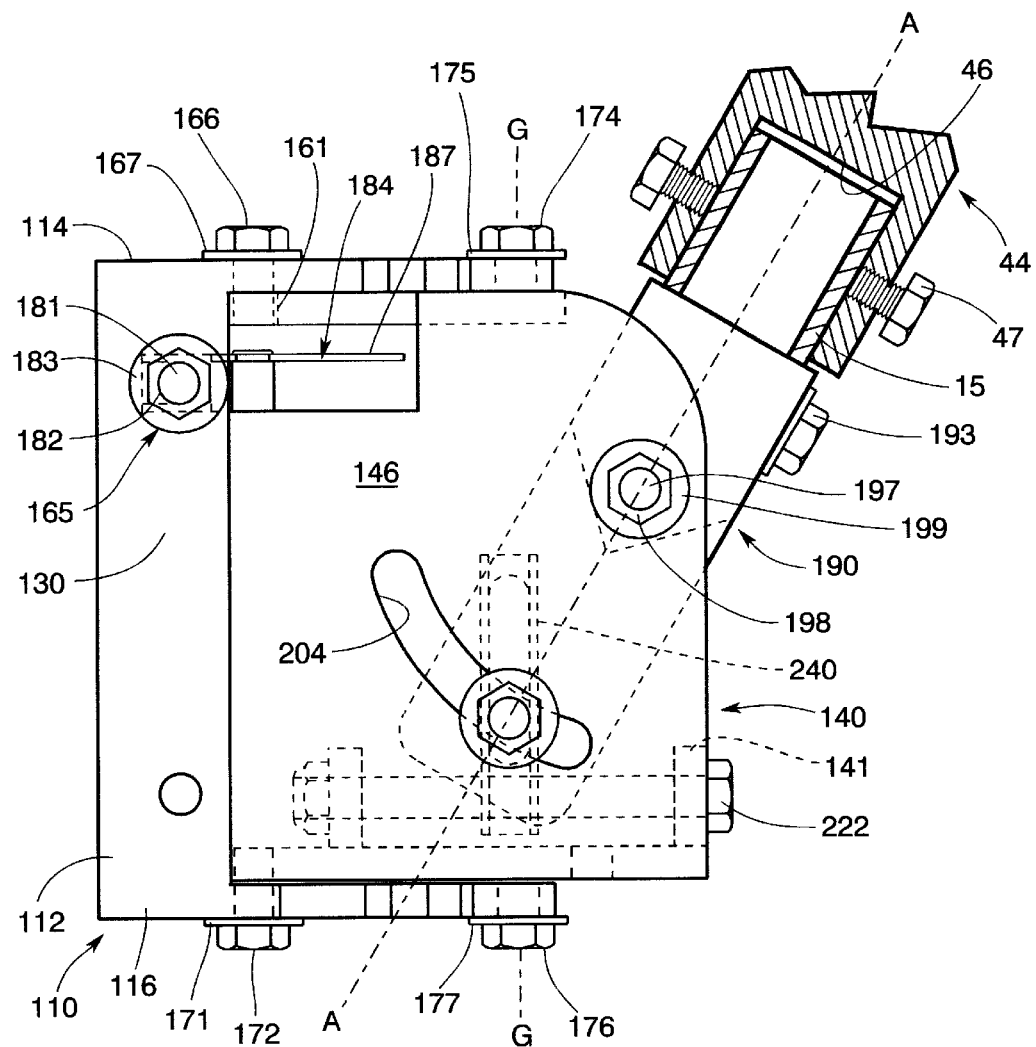
FIG. 12 is a side elevational view of the mounting bracket depicted in FIGS. 4–11 supporting an antenna mast that is attached to a support arm of an antenna.

Also in this embodiment, to control the pivotal travel of the mast support member 190 about the second pivot axis J—J and to positively retain the mast support member 190 in position about the second pivot axis J—J while the lock nuts (198, 210) are tightened, a second adjustment assembly or "second means for retaining", generally designated as 200 is provided. In this embodiment, the second adjustment assembly or second means for retaining 200 includes a second shoulder bolt 201. More particularly and with reference to FIGS. 7 and 11, a primary arcuate slot 202 is provided in the side plate 142 of the support member 140. Primary arcuate slot 202 is radially aligned about the center of hole 143 through which the second pivot axis J—J extends. The primary arcuate slot 202 is sized to slidably receive a portion of the second shoulder bolt 201 therethrough. The center of the primary arcuate slot 202 is oriented at a radius "R"" with respect to the center of the hole 143. See FIG. 7. Similarly, a secondary slot 204 is provided through the side plate 146 of the support member 140. See FIG. 12. Secondary arcuate slot 204 is radially aligned about the center of hole 147 through which the second pivot axis J—J extends. The secondary arcuate slot 204 is sized to slidably receive therethrough another portion of the second shoulder bolt 201. The center of the secondary slot 204 is aligned at a radius with respect to the center of hole 147 that is equal to radius R". As can be seen in FIGS. 9 and 10, washers (206, 208) are received on the second shoulder bolt 201 and a second lock nut 210 is threaded onto the threaded end thereof.

The second adjustment assembly or second means for retaining 200 of this embodiment also includes a "second rotatable adjustment member" which may comprise a second threaded adjustment bolt 222 that extends through a non-threaded hole 226 in a front plate member 224 that comprises a portion of the support member 140. Adjustment bolt 222 further extends through a non-threaded hole 228 in a rear plate 230 that comprises a portion of the support member 140. Adjustment bolt 222 is rotatably supported on the front plate 224 and the rear plate 230 by a lock nut 232. See FIG. 11. A second pivot bar 240 is movably attached by means of threads to the second adjustment bolt 222. The second pivot bar 240 may be fabricated from a piece of hollow metal tubing or other suitable material. As can be seen in FIG. 5, one end of the second pivot bar 240 has a pair of coaxially aligned threaded holes 242 for attaching the second pivot bar 240 to the second adjustment bolt 222. As can be further seen in FIG. 5, the second pivot bar 240 has an axially extending slot 244 for slidably receiving a portion of the second shoulder bolt 201 therein. A pair of spacer sleeves (250, 252) are slidably received on the second shoulder bolt 201 with one spacer sleeve being oriented on each side of the second pivot bar 240 to prevent binding of the second pivot bar 240 on the second shoulder bolt 201. See FIGS. 10 and 15. The skilled artisan will appreciate that the spacer sleeves (250, 252) and the pivot bar 240 could comprise a unitary member if so desired. It will be further appreciated that after the nuts (198, 210) have been loosened, the mast support member 190 may be selectively pivoted about the second pivot axis J—J in the directions represented by arrows "K" and "L" by rotating the second adjustment bolt 200 in the appropriate directions. See FIG. 11. After the mast support member 190 has been pivoted to a desired position, it is then "locked" in position by tightening the lock nuts (198, 210).

Figure 15:
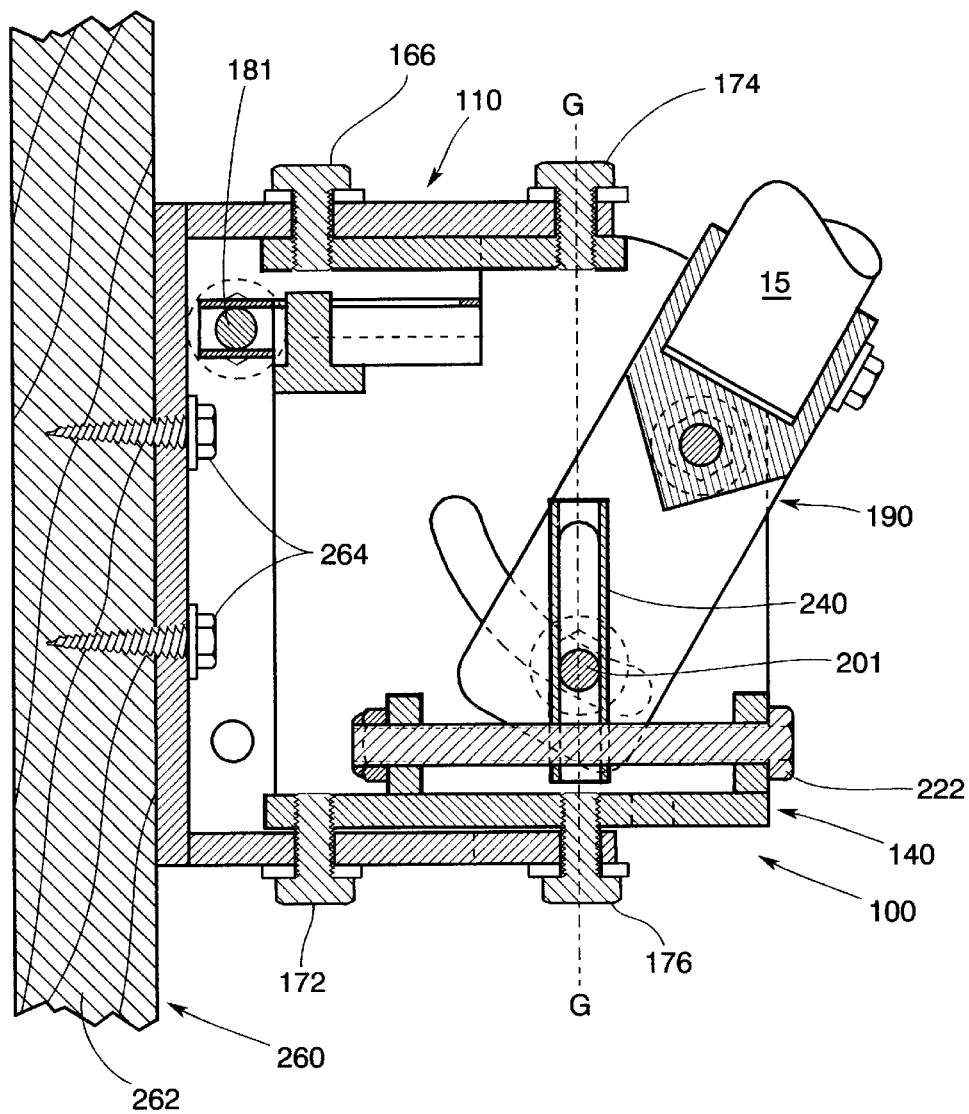
FIG. 15 is a cross-sectional view of a mounting bracket of the present invention attached to a vertical wall of a structure.
Figure 16:
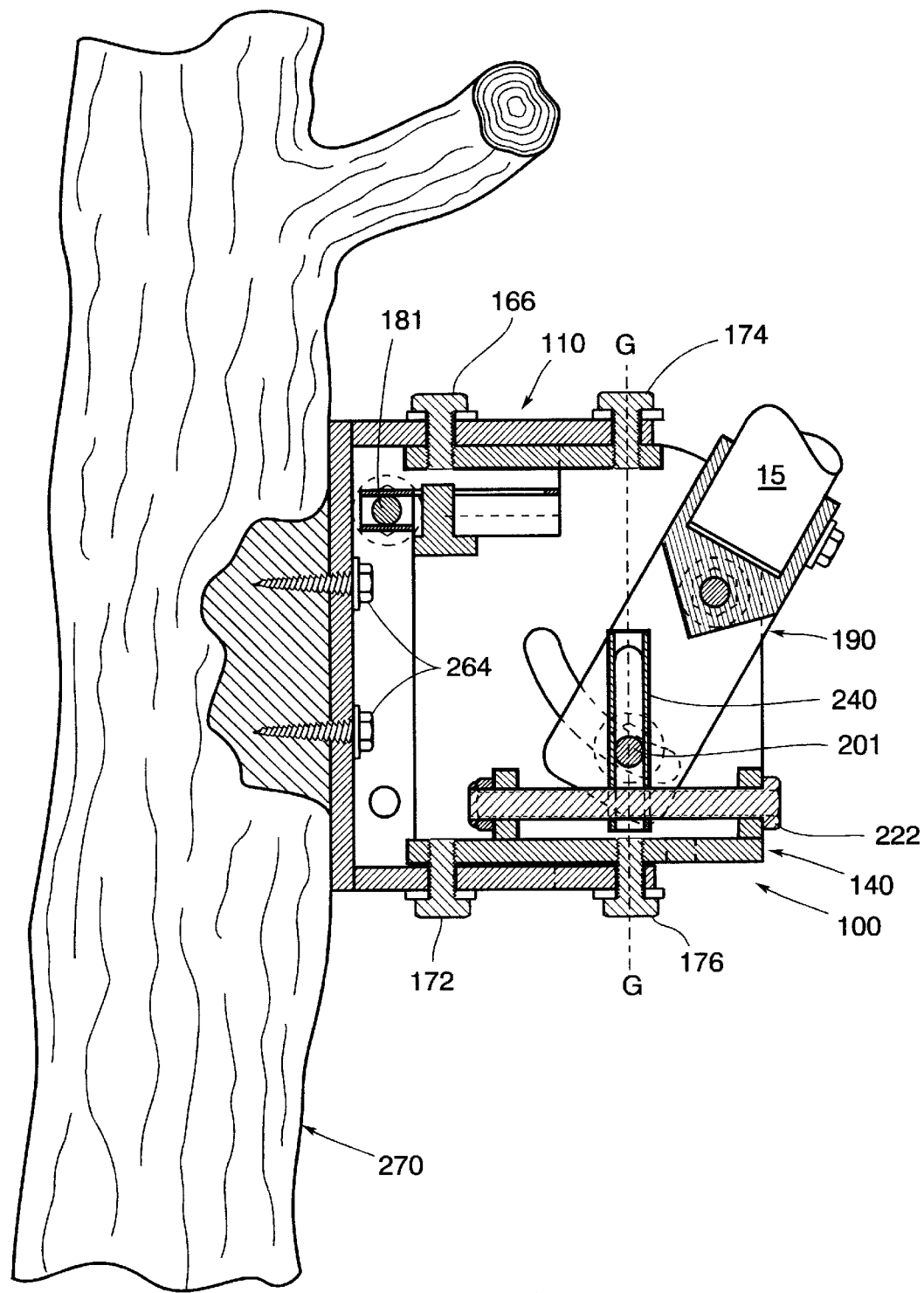
FIG. 16 is a cross-sectional view of a mounting bracket of the present invention attached to a tree.
Figure 17:
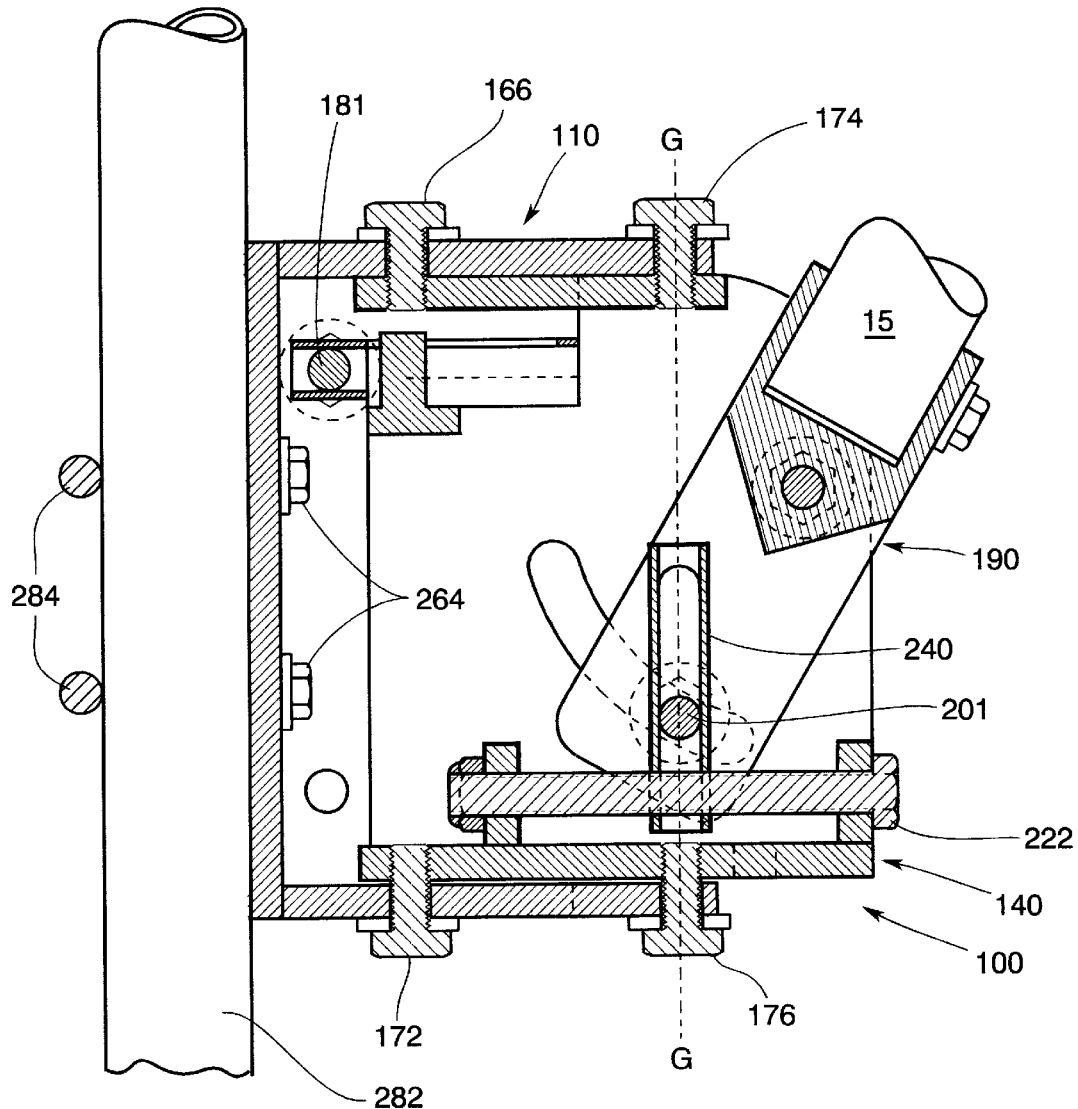
FIG. 17 is a cross-sectional view of a mounting bracket of the present invention attached to a vertically extending pole or mast.
Figure 18:
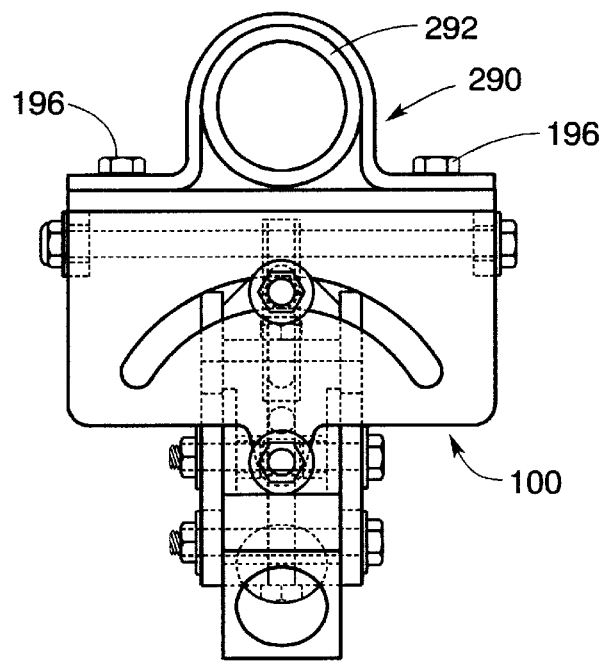
FIG. 18 is a cross-sectional view of a mounting bracket of the present invention attached to a vertically extending pole or mast by a conventional saddle bracket.
Figure 19:
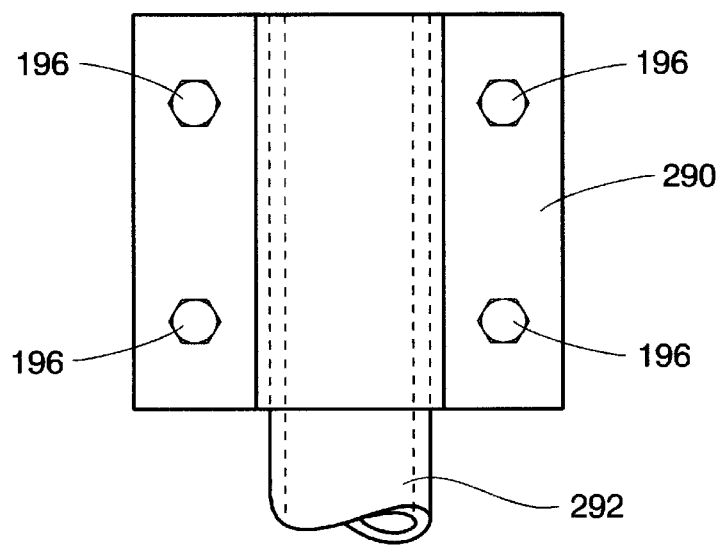
FIG. 19 is a rear view of the mounting bracket and saddle bracket of FIG. 18.
Figure 20:
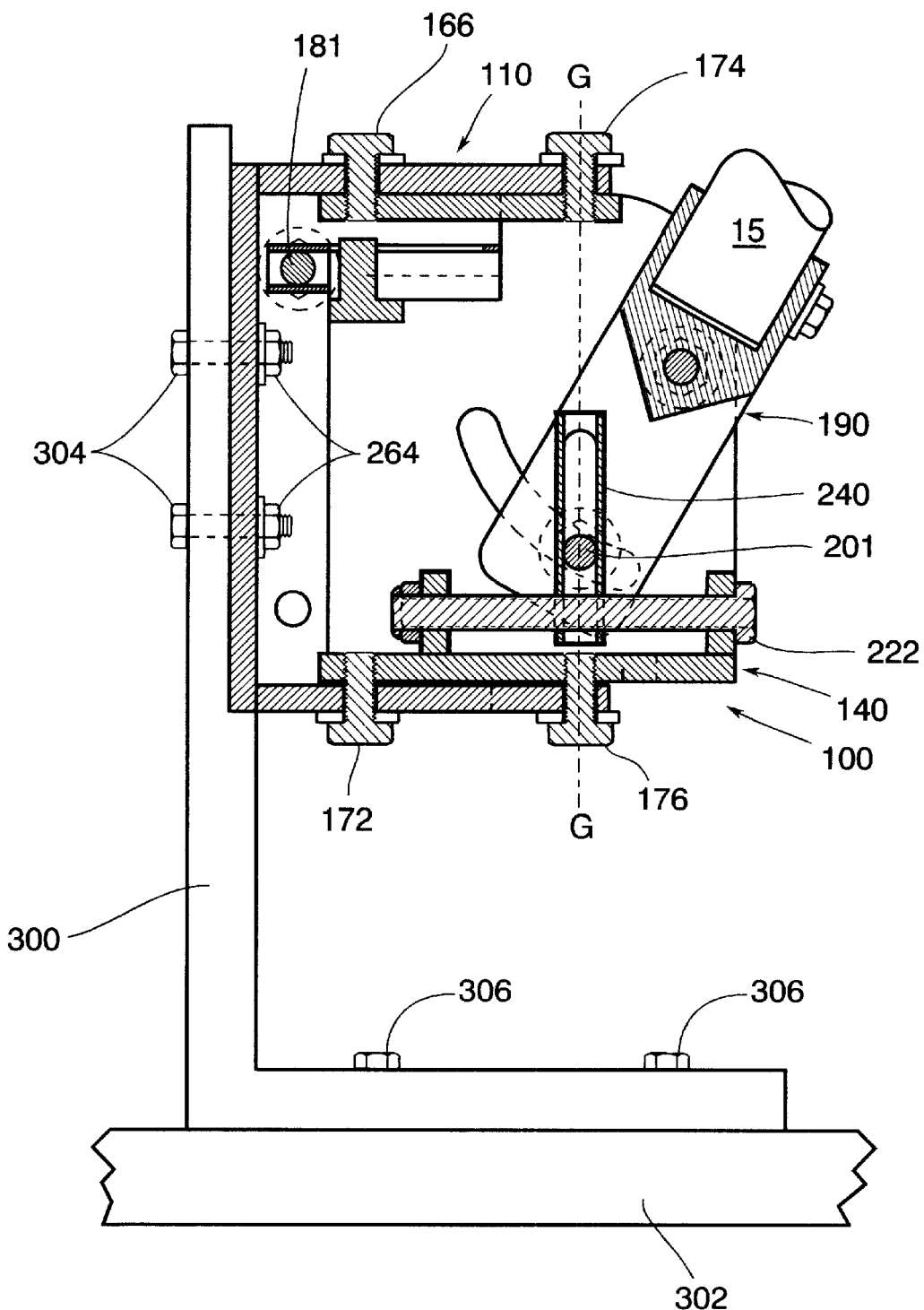
FIG. 20 is a cross-sectional view of a mounting bracket of the present invention attached to an L-shaped bracket attached to a horizontal support surface.

To use this embodiment of the mounting bracket 100 of the present invention, the mounting member 110 is attached to a support member such as a wall, tree, support mast, etc. For example, as illustrated in FIG. 15, the mounting member 110 may be attached to a vertically extending portion 262 of a building 260 or other structure by mounting screws 264. As shown in FIG. 16, the mounting member 110 may be attached to a portion of tree 270 by appropriate screws 264. FIG. 17 illustrates the use of conventional clamps 284 to clamp the mounting member to a mast 282, a portion of which is either attached to another structure or is buried in the earth such that it is plumb. FIGS. 18 and 19 illustrate the use of a conventional saddle clamp 290 to clamp the mounting member to a mast 292, a portion of which is either attached to another structure or is buried in the earth such that it is plumb. As can be seen in those Figures, the saddle clamp 290 is attached to the mounting 110 by four bolts 196 or other suitable fasteners. FIG. 20 illustrates the attachment of the mounting member 110 to an L-shaped bracket 300 that is attached to a horizontal support member 302 such as a portion of a deck or the like. The L-shaped bracket is attached to the mounting member by bolts 304 or other suitable fasteners. The other portion of the L-shaped bracket 300 is attached to the support surface 302 by wood screws 306 or other suitable fasteners.

Figure 8A:
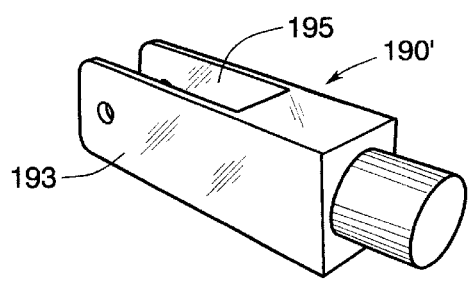
FIG. 8A is a perspective view of another mast support member of the present invention.
Figure 12A:
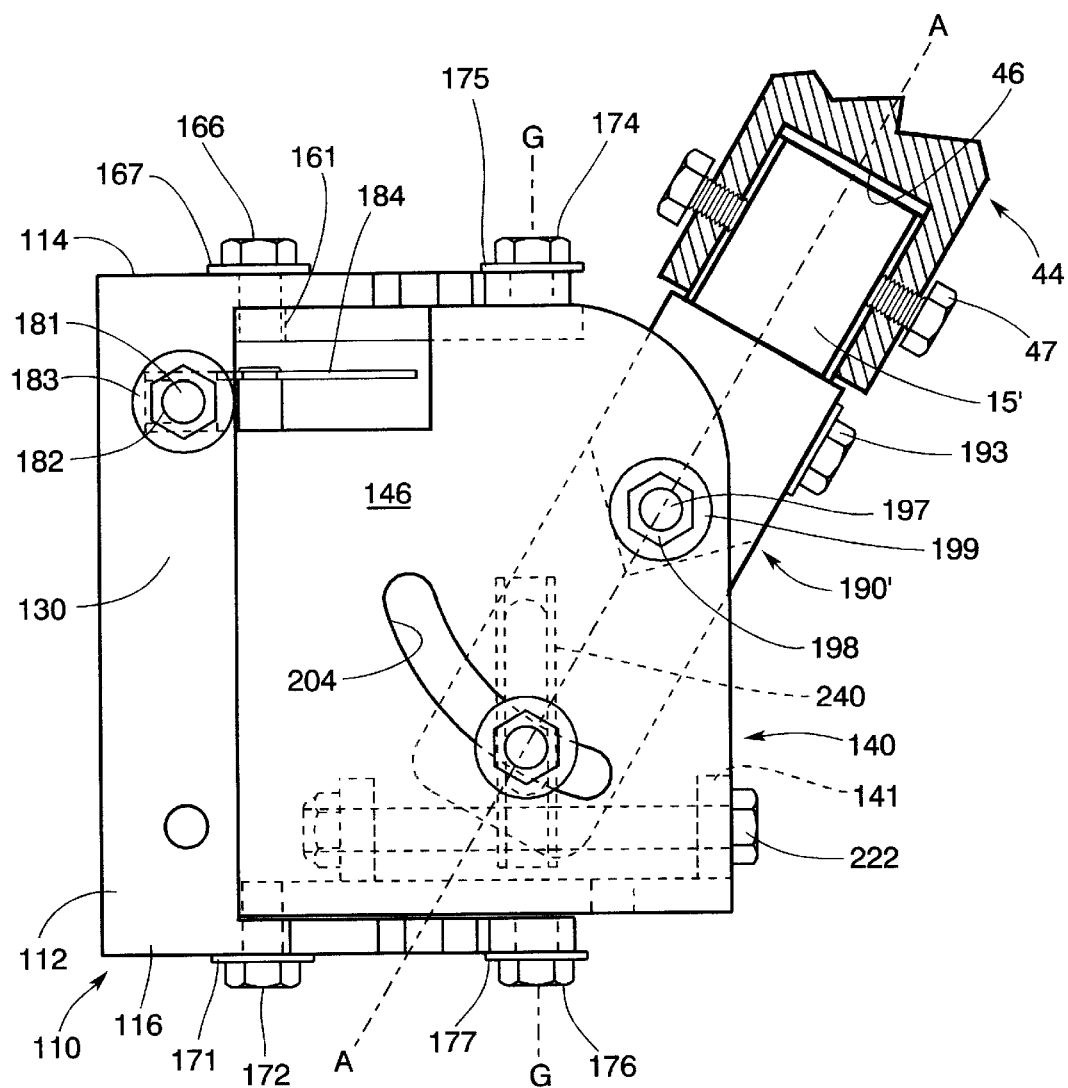
FIG. 12A is a side elevational view of another embodiment of the mounting bracket of the present invention employing the mast support member depicted in FIG. 8A.

After the mounting member 110 has been mounted to a support structure, the antenna mast 15 is inserted into the mast-receiving socket 192 in the mast support member 190. Antenna mast 15 may be retained in the socket 192 by one or more retaining screws 193 that are threaded into engagement with the antenna mast 15. See FIG. 11. However, other fasteners and attachment methods may be employed for affixing the antenna mast 15 to the antenna mast support member 190. In this embodiment, the antenna 20 is connected to the mounting mast 15 by a rearwardly extending portion 44 of the support arm 40. A socket 46 is provided in the rearwardly extending portion 44 for receiving the other end of the antenna mast 15 therein. The mast is retained in the socket 46 by locking screws 47. See FIGS. 3 and 12. Those of ordinary skill in the art will readily appreciate, however, that other antenna arrangements and designs may be successfully used in connection with the mounting bracket 100 of the present invention. For example, an alternate embodiment of the mast support member 190 is depicted in FIGS. 8A and 12A. As can be seen in those Figures, the mast support member 190' is identical to mast support member 190 described above, except that the mast support member 190' has an integral mast 15' protruding therefrom which can be inserted into the socket 46 of a support arm 40 and retained therein by locking screws 47.

Figure 3:
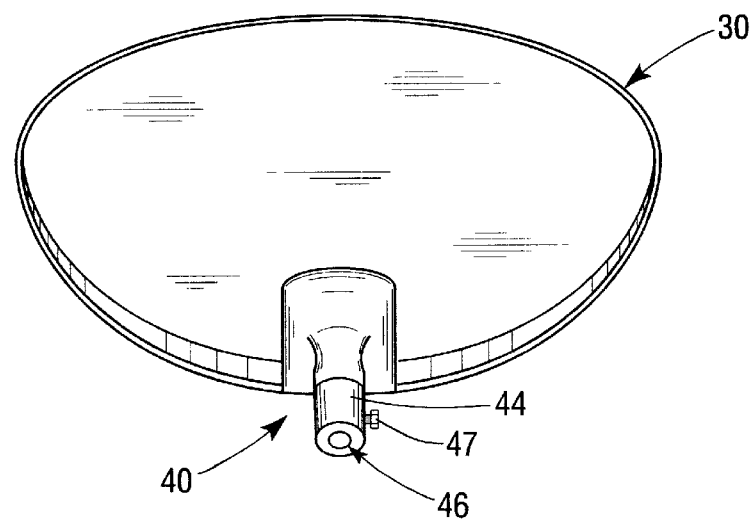
FIG. 3 is a rear view of the antenna depicted in FIG. 2.

In the antenna design depicted in FIGS. 1–3, the antenna's centerline axis A—A is coaxially aligned with the center of the antenna mounting mast 15 and the mast-receiving socket 192 in the mast-support member 190. Thus, such arrangement permits the antenna 20 to be readily adjusted for satellite skew by loosening the retaining screws 193 and rotating the mounting mast (and antenna 20 attached thereto) within the mast-receiving socket 192 until the desired skew orientation is achieved. Thereafter, the retaining screws 193 are screwed into engage the antenna mast 15 and retain it in that position. When employing the embodiment depicted in FIG. 12A, the antenna 20 may also be oriented in a desired skew orientation by loosening the locking screws 47 in the rearwardly extending portion 44 of the support arm 40 and rotating the rearwardly extending portion 44 about mast protrusion 15' therein until the antenna 20 is in a desired orientation. Thereafter, the locking screws 47 are screwed into engage the mast protrusion 15' to retain the antenna 20 in that position. Such arrangement enables the antenna 20 to be easily adjusted for satellite skew without altering the antenna's azimuth and/or elevation orientations.

After the antenna has been attached to the mounting bracket 100, the antenna's azimuth may be easily adjusted by loosening the lock screws (166, 172, 174, 176). Thereafter, the first adjustment bolt 181 is rotated in the appropriate direction to cause the support member 140 to pivot in a desired direction about the first pivot axis G—G. Such rotation of the adjustment bolt causes the pivoting of the support member 140 about the first pivot axis G—G in a controlled manner. Those of ordinary skill in the art will appreciate that the first adjustment assembly, by virtue of the threaded engagement of the first pivot bar 184 with the first adjustment bolt 181, serves to positively retain the support member in the desired position while the lock screws (166, 172, 174, 176) are tightened to rigidly retain the support member 140 in that position. Thus, this aspect of the present invention represents a vast improvement over prior antenna mounting brackets that lack means for positively retaining support member in a desired azimuth position, while the locking members are tightened.

To adjust the antenna's elevation, the lock nut 198 and the lock nut 210 are loosened. Thereafter, the second adjustment bolt 222 is rotated in the appropriate direction to cause the mast support member 190 to pivot in the desired direction about the second pivot axis J—J in a controlled manner. Those of ordinary skill in the art will appreciate that the second adjustment assembly, by virtue of the threaded engagement of the second pivot bar 240 with the second adjustment bolt 222, serves to positively retain the mast support member 190 in the desired position while the lock nuts (198, 210) are tightened to rigidly retain the mast support member 190 in that position. Thus, this aspect of the present invention represents a vast improvement over prior antenna mounting brackets that lack means for positively retaining the mast-supporting member in a desired elevational position, while the locking members are tightened.

Figure 21:
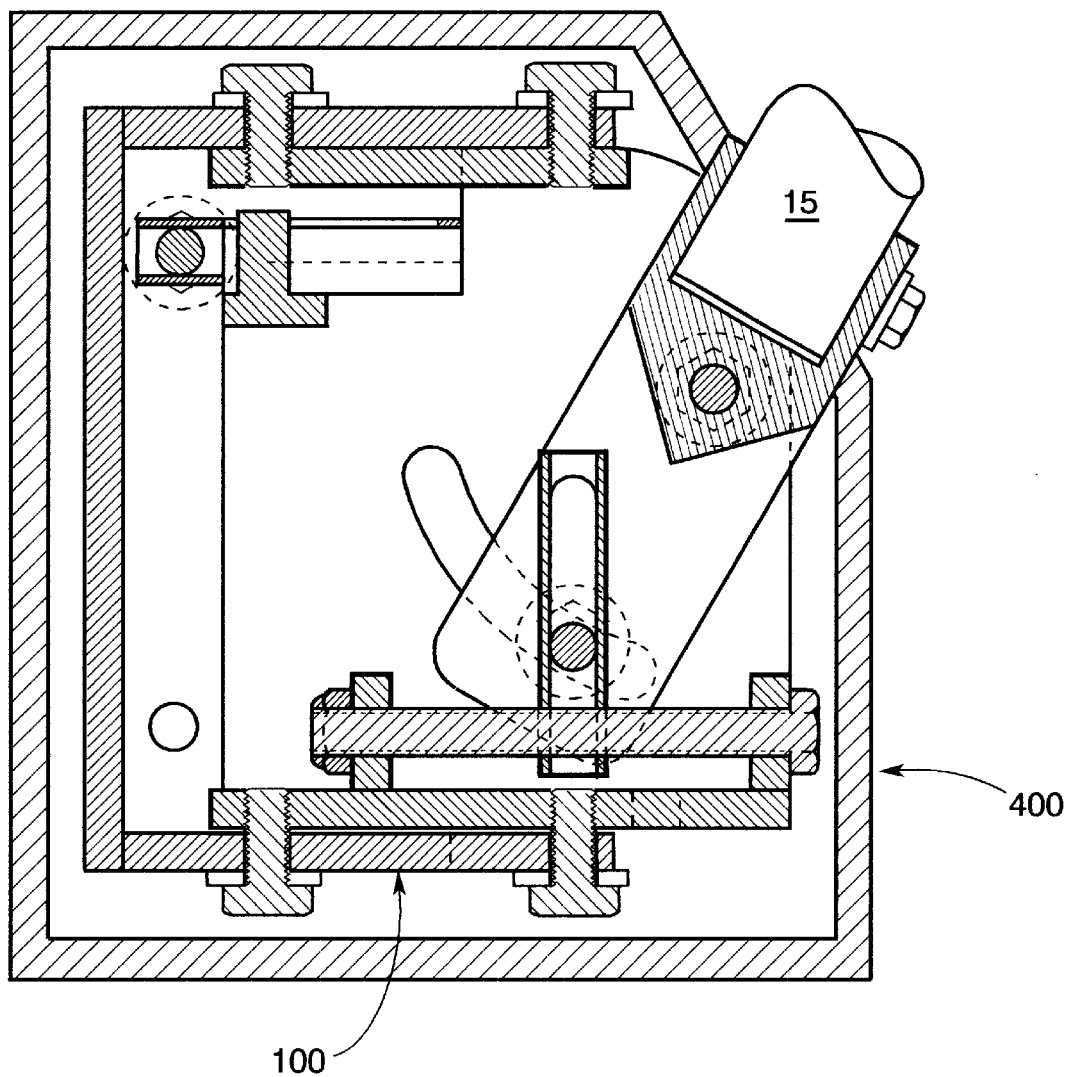
FIG. 21 is a cross-sectional view of a mounting bracket and shroud of the present invention.

The above-described mounting bracket embodiment is particularly useful for mounting and orienting an antenna along a plurality of axes. Those of ordinary skill in the art will appreciate that the mast support member 190 described above could be provided in a variety of other configurations that are adapted to attach various other objects to the mounting bracket. Those of ordinary skill in the art will further appreciate that for applications that require the mounting bracket to be exposed to the elements, the various fasteners employed in the mounting bracket may be fabricated from corrosion resistant material such as stainless steel or the like. Furthermore, the fasteners employed in the mounting bracket 100 may comprise the same size of screw or bolt (not necessarily the same length) such that a single wrench may be employed by the installer to mount the bracket and make all of the adjustments thereto. Also, if desired, to protect the mounting bracket 100 from the elements and establish a more aesthetically pleasing appearance, a shroud 400 made from a suitable material may be placed around the bracket. See FIG. 21. Shroud 400 may be fabricated from flexible plastic or rig plastic and may be one or more parts that are fastened together around the mounting bracket 100 by appropriate fasteners, such as screws, etc.

Thus, the mounting brackets of the present invention represents a great improvement over prior antenna mounting brackets. The present invention is relatively easy to manufacture and install. Because the mounting brackets of the present invention positively retain and support the antenna or other object attached thereto after the azimuth and/or elevation thereof have been adjusted and while the locking screws/bolts/are being locked in position. The mounting bracket of the present invention can be mounted apart from the antenna reflector itself such that the bracket does not detract from the reflector's aesthetic appearance. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A bracket for supporting an object about a first pivot axis, said bracket comprising:

a mounting member;

a support member pivotally attached to said mounting member for selective pivotal travel about the first pivot axis;

a first adjustment assembly attached to said mounting member and said support member for selectively adjusting the position of said support member about the first pivot axis relative to said mounting member;

at least two first lock members pivotally coupling said support member to said mounting member for selective pivotal travel about the first pivot axis and selectively preventing pivotal travel of said support member about said first pivot axis relative to said mounting member; and an object support member attached to said support member.

2. The mounting bracket of claim 1 further comprising a mounting bracket shroud removably attached around said mounting bracket.

3. The bracket of claim 1 wherein said first lock members comprise screws.

4. The bracket of claim 1 wherein said first adjustment assembly comprises:

a first adjustment member supported by said mounting member;

a first pivot bar threadably attached to said first adjustment member; and a first pivot member attached to said support member and being slidably journaled in said first pivot bar.

5. The mounting bracket of claim 1 wherein said object support member is pivotally attached to said support member for selective pivotal travel about a second pivot axis.

6. The mounting bracket of claim 5 wherein said second pivot axis is perpendicular to said first pivot axis.

7. The mounting bracket of claim 5 further comprising a second lock member for selectively preventing pivotal travel of the object support member about the second pivot axis relative to the support member.

8. The mounting bracket of claim 5 further comprising a second adjustment assembly attached to said support member and said object support member for selectively adjusting the position of the object support member about the second pivot axis relative to said support member.

9. The bracket of claim 8 wherein said second adjustment assembly comprises:

a pivot member extending through said support member and said object support member; and an adjustment member supported by said support member and attached to said pivot member.

10. The bracket of claim 9 wherein said adjustment member is attached to said pivot member by a pivot bar slidably journaled on said second pivot member and threadably attached to said adjustment member.

11. The mounting bracket of claim 1 wherein said object support member further comprises:

a socket in said object support member; and a retainer for retaining a portion of an object in said socket.

12. The mounting bracket of claim 1 wherein said object support member further comprises a mast portion integrally protruding therefrom.

13. The bracket of claim 1 wherein said support member is pivotally attached to said mounting member by at least two said first lock members.

14. The bracket of claim 13 wherein said first lock members comprise screws.

15. A mounting bracket for adjustably supporting an antenna mast, said bracket comprising:

a mounting member;

a support member pivotally connected to said mounting member for selective pivotal travel about a first pivot axis relative to said mounting member;

a first pivot member connected to said support member;

a first threaded adjustment member rotatably supported by said mounting member;

a first pivot bar slidably journaled on said first pivot member and coupled to said first threaded adjustment member such that rotation of said first threaded adjustment member causes said support member to pivot about said first pivot axis relative to said mounting member;

a mast support member pivotally attached to said support member for selective pivotal travel about a second pivot axis;

a second pivot member extending through said mast support member and said support member;

a second threaded adjustment member rotatably supported in said mounting member; and a second pivot bar slidably journaled on said second pivot member and threadably coupled to said second adjustment member such that rotation of said second threaded adjustment member causes said mast support member to pivot about said second pivot axis relative to said support member.

16. A bracket for supporting an object about a first pivot axis, said bracket comprising:

mounting means;

support means pivotally connected to said mounting means for selective pivotal travel about the first pivot axis;

means for selectively adjusting the pivotal travel of the support means about the first axis relative to the mounting means, said means for selectively adjusting the pivotal travel of the support means being supported within said mounting means and extending along an axis that is substantially transverse to the first pivot axis; and means for supporting the object attached to said support means.

17. A mounting bracket for adjustably supporting an antenna mast, said bracket comprising:

a mounting member;

a support member pivotally connected to said mounting member for selective pivotal travel about a first pivot axis relative to said mounting member;

a first pivot member connected to said support member;

a first adjustment member supported by said mounting member;

a first pivot bar slidably journaled on said first pivot member and coupled to said first adjustment member;

a mast support member pivotally attached to said support member for selective pivotal travel about a second pivot axis;

a second pivot member extending through said mast support member and said support member;

a second adjustment member supported by said mounting member; and a second pivot bar slidably journaled on said second pivot member and coupled to said second adjustment member.

18. An antenna mounting bracket comprising:

mounting means;

support means pivotally connected to said mounting means for selective pivotal travel about a first pivot axis;

means for selectively adjusting the pivotal travel of the support means about the first axis relative to the mounting means, said means for selectively adjusting the pivotal travel of the support means being supported within said mounting means;

antenna mast supporting means pivotally attached to said support means for selective pivotal travel about a second pivot axis relative to said support means; and means for selectively adjusting the pivotal travel of the antenna mast supporting means about the second pivot axis.

19. An antenna mounting bracket comprising:

mounting means;

support means pivotally connected to said mounting means for selective pivotal travel about a first pivot axis;

means for selectively locking said support means to said mounting means to prevent further movement of said support means relative to said mounting means;

means for preventing said support means from moving relative to said mounting means as said means for selectively locking is locked;

antenna mast support means pivotally attached to said means for supporting for selective pivotal travel about a second pivot axis relative to said means for supporting;

means for selectively locking said antenna mast support means to said support means to prevent further movement of said antenna mast support means relative to said support means; and means for preventing said antenna mast support means from moving relative to said support means as said means for selectively locking is locked.

20. A bracket for supporting an object about a first pivot axis, said bracket comprising:

a mounting member;

a support member pivotally attached to said mounting member for selective pivotal travel about the first pivot axis;

a first adjustment assembly attached to said mounting member and said support member for selectively adjusting the position of said support member about the first pivot axis relative to said mounting member, said first adjustment assembly comprising:

a first adjustment member supported by said mounting member;

a first pivot bar threadably attached to said first adjustment member; and a first pivot member attached to said support member and being slidably journaled in said first pivot bar;

a first lock member for selectively preventing pivotal travel of said support member about said first pivot axis relative to said mounting member; and an object support member attached to said support member.

21. The mounting bracket of claim 20 wherein said object support member is pivotally attached to said support member for selective pivotal travel about a second pivot axis.

22. The mounting bracket of claim 21 further comprising a second lock member for selectively preventing pivotal travel of the object support member about the second pivot axis relative to the support member.

23. The mounting bracket of claim 21 further comprising a second adjustment assembly attached to said support member and said object support member for selectively adjusting the position of the object support member about the second pivot axis relative to said support member.

24. The mounting bracket of claim 23 wherein said second adjustment assembly comprises:

a second pivot member extending through said support member and said object support member; and a second adjustment member supported by said support member and attached to said pivot member.

25. The mounting bracket of claim 24 wherein said second adjustment member is attached to said second pivot member by a second pivot bar slidably journaled on said second pivot member and threadably attached to said second adjustment member.

26. The mounting bracket of claim 21 wherein said second pivot axis is perpendicular to said first pivot axis.

27. The mounting bracket of claim 20 wherein said object support member further comprises:

a socket in said object support member; and a retainer for retaining a portion of an object in said socket.

28. The mounting bracket of claim 20 wherein said object support member further comprises a mast portion integrally protruding therefrom.

29. The mounting bracket of claim 20 further comprising a mounting bracket shroud removably attached around said mounting bracket.

* * * * *